United States Patent
Kozlowski et al.

(10) Patent No.: US 10,953,895 B2
(45) Date of Patent: Mar. 23, 2021

(54) DYNAMIC FORWARD COLLISION ALERT SYSTEM

(71) Applicant: GM Global Technology Operations LLC, Detroit, MI (US)

(72) Inventors: William L. Kozlowski, Novi, MI (US); Paul A. Adam, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 18 days.

(21) Appl. No.: 16/394,643

(22) Filed: Apr. 25, 2019

(65) Prior Publication Data

US 2020/0339143 A1    Oct. 29, 2020

(51) Int. Cl.
| | |
|---|---|
| *B60W 50/14* | (2020.01) |
| *B60W 30/095* | (2012.01) |
| *B60W 40/08* | (2012.01) |
| *G08G 1/16* | (2006.01) |
| *G06K 9/00* | (2006.01) |

(52) U.S. Cl.
CPC .......... *B60W 50/14* (2013.01); *B60W 30/095* (2013.01); *B60W 40/08* (2013.01); *G06K 9/00845* (2013.01); *G08G 1/166* (2013.01); *B60W 2040/0818* (2013.01); *B60W 2050/143* (2013.01); *B60W 2554/801* (2020.02)

(58) Field of Classification Search
USPC ........................................................ 340/435
See application file for complete search history.

(56) References Cited

U.S. PATENT DOCUMENTS

| | | | | |
|---|---|---|---|---|
| 9,953,534 | B1* | 4/2018 | Malla | B60W 30/09 |
| 10,875,536 | B2* | 12/2020 | Fung | B62D 6/00 |
| 2009/0177359 | A1* | 7/2009 | Ihara | G01S 13/931 |
| | | | | 701/45 |
| 2009/0243880 | A1* | 10/2009 | Kiuchi | G08G 1/166 |
| | | | | 340/903 |
| 2010/0007480 | A1* | 1/2010 | Uozumi | B60W 40/09 |
| | | | | 340/436 |
| 2011/0190972 | A1* | 8/2011 | Timmons | G08G 1/166 |
| | | | | 701/31.4 |
| 2012/0101701 | A1* | 4/2012 | Moshchuk | B60W 30/09 |
| | | | | 701/70 |
| 2013/0321628 | A1* | 12/2013 | Eng | B60R 1/00 |
| | | | | 348/148 |

(Continued)

*Primary Examiner* — Stephen R Burgdorf

(57) ABSTRACT

A method of providing a collision warning within a vehicle comprises detecting an object and determining the distance to the object, identifying when a driver is distracted and measuring the time that the driver has been distracted, calculating an actual time to collision, modifying first and second pre-determined time to collision thresholds based on information from the driver monitoring system and creating first and second modified time to collision thresholds, comparing the actual time to collision to the first and second modified time to collision thresholds, sending a signal to a driver interface to provide an initial warning to the driver when the actual time to collision is less than the first modified time to collision threshold, and sending a signal to the driver interface to provide an imminent collision warning to the driver when the actual time to collision is less than the second modified time to collision threshold.

10 Claims, 1 Drawing Sheet

(56) References Cited

U.S. PATENT DOCUMENTS

| | | | |
|---|---|---|---|
| 2014/0009276 A1* | 1/2014 | Backhouse | B60Q 9/008 340/436 |
| 2014/0142798 A1* | 5/2014 | Guarnizo Martinez | G08G 1/16 701/23 |
| 2016/0001781 A1* | 1/2016 | Fung | G16H 50/20 701/36 |
| 2016/0075332 A1* | 3/2016 | Edo-Ros | B60T 7/22 701/70 |
| 2020/0269867 A1* | 8/2020 | Hua | B60W 40/09 |

* cited by examiner

DYNAMIC FORWARD COLLISION ALERT SYSTEM

INTRODUCTION

The present disclosure relates to a system in an automotive vehicle that monitors the distance between the vehicle and an object in front of the vehicle and provides a warning to the driver of the vehicle based on the time it will take for the vehicle to collide with the object.

Many automobiles today are equipped with sensors and radar that will detect objects in front of the vehicle. These systems use the speed of the vehicle and the distance between the vehicle and the object to calculate a time to collision (TTC). The system uses a first pre-determined TTC threshold to trigger an initial warning to let the driver know that the distance between the object and the vehicle is less than what is considered a safe distance at that speed. The system uses a second pre-determined TTC threshold to trigger a secondary warning to let the driver know that a collision is imminent.

Existing systems are based solely on the speed of the vehicle, the distance between the vehicle and the object in front of the vehicle, and a pre-determined safe distance for the speed of the vehicle. Such systems do not take into consideration the impact of an inattentive driver. If a driver is not paying attention, or is distracted, the reaction time of the driver may be delayed. When this happens, the driver may not react as quickly as an attentive driver. The pre-determined TTC thresholds are calibrated for the reaction time of an attentive driver, and may not provide adequate time for the driver to notice the warning and react quickly enough to prevent a collision.

Thus, while current systems achieve their intended purpose, there is a need for a new and improved system and method that will detect when a driver is distracted, evaluate how severely distracted the driver is, and adjust pre-determined TTC times based on the driver being distracted.

SUMMARY

According to several aspects of the present disclosure, a system for providing warning of an impending collision to a driver of an automotive vehicle comprises a detection system adapted to detect an object in front of the vehicle and to determine the distance between the object and the vehicle, a driver monitoring system adapted to identify when a driver of the vehicle is distracted and to measure the amount of time that the driver of the vehicle has been distracted, a driver interface within the vehicle, and a controller adapted to receive information from the detection system and the driver monitoring system, calculate an actual time to collision based on the distance between the object and the vehicle and the speed of the vehicle, modify a pre-determined time to collision threshold based on information from the driver monitoring system, compare the actual time to collision to the modified time to collision threshold, and send a signal to the driver interface to provide a warning to the driver of the vehicle when the actual time to collision is less than the modified time to collision threshold.

According to another aspect of the present disclosure, the driver monitoring system includes a camera mounted within the vehicle and adapted to recognize and determine the position of the face of a driver of the vehicle.

According to another aspect of the present disclosure, the detection system is an external object computation module that uses a plurality of detection devices and a sensor-object fusion algorithm to detect and determine the distance between the object and the vehicle.

According to another aspect of the present disclosure, when the driver monitoring system indicates the driver of the vehicle is distracted the controller is adapted to modify the pre-determined time to collision threshold such that the modified time to collision threshold is greater than the pre-determined time to collision threshold.

According to another aspect of the present disclosure, when the driver monitoring system indicates the driver of the vehicle is distracted the controller is adapted to modify the pre-determined time to collision threshold such that the modified time to collision threshold is directly related to the length of time the driver has been distracted and the modified time to collision threshold increases as the length of time the driver has been distracted increases.

According to another aspect of the present disclosure, when the driver monitoring system indicates the driver of the vehicle is not distracted the controller is adapted to modify the pre-determined time to collision threshold such that the modified time to collision threshold is equal to the pre-determined time to collision threshold.

According to another aspect of the present disclosure, the controller identifies the pre-determined time to collision threshold from a look-up table stored within the controller based on the speed of the vehicle and the actual time to collision.

According to several aspects of the present disclosure, a system for providing warning of an impending collision to a driver of an automotive vehicle comprises a detection system adapted to detect an object in front of the vehicle and to determine the distance between the object and the vehicle, a driver monitoring system adapted to identify when a driver of the vehicle is distracted and to measure the amount of time that the driver of the vehicle has been distracted, a driver interface within the vehicle, and a controller adapted to receive information from the detection system and the driver monitoring system, calculate an actual time to collision based on the distance between the object and the vehicle and the speed of the vehicle, modify a first pre-determined time to collision threshold based on information from the driver monitoring system to create a first modified time to collision threshold, modify a second pre-determined time to collision threshold based on information from the driver monitoring system to create a second modified time to collision threshold, compare the actual time to collision to the first and second modified time to collision thresholds, send a signal to the driver interface to provide an initial warning to the driver of the vehicle when the actual time to collision is less than the first modified time to collision threshold, and send a signal to the driver interface to provide an imminent collision warning to the driver of the vehicle when the actual time to collision is less than the second modified time to collision threshold.

According to another aspect of the present disclosure, the driver monitoring system includes a camera mounted within the vehicle and adapted to recognize and determine the position of the face of a driver of the vehicle.

According to another aspect of the present disclosure, the detection system is an external object computation module that uses a plurality of detection devices and a sensor-object fusion algorithm to detect and determine the distance between the object and the vehicle.

According to another aspect of the present disclosure, when the driver monitoring system indicates the driver of the vehicle is distracted the controller is adapted to modify the first and second pre-determined time to collision thresholds equally such that the first modified time to collision threshold is greater than the first pre-determined time to collision threshold and the second modified time to collision threshold is greater than the second pre-determined time to collision threshold.

According to another aspect of the present disclosure, when the driver monitoring system indicates the driver of the vehicle is distracted the controller is adapted to modify the first and second pre-determined time to collision thresholds such that the first and second modified time to collision thresholds are directly related to the length of time the driver has been distracted and the first and second modified time to collision thresholds increases as the length of time the driver has been distracted increases.

According to another aspect of the present disclosure, when the driver monitoring system indicates the driver of the vehicle is not distracted the controller is adapted to modify the first and second pre-determined time to collision thresholds such that the first modified time to collision threshold is equal to the first pre-determined time to collision threshold and the second modified time to collision threshold is equal to the second pre-determined time to collision threshold.

According to another aspect of the present disclosure, the controller identifies the first and second pre-determined time to collision thresholds from a look-up table stored within the controller based on the speed of the vehicle and the actual time to collision.

According to several aspects of the present disclosure, a method of providing warning of an impending collision to a driver of an automotive vehicle comprises detecting an object in front of the vehicle and determining the distance between the object and the vehicle with a detection system, identifying when a driver of the vehicle is distracted and measuring the amount of time that the driver of the vehicle has been distracted with a driver monitoring system, calculating an actual time to collision based on the distance between the object and the vehicle and the speed of the vehicle, modifying a first pre-determined time to collision threshold based on information from the driver monitoring system and creating a first modified time to collision threshold, modifying a second pre-determined time to collision threshold based on information from the driver monitoring system and creating a second modified time to collision threshold, comparing the actual time to collision to the first and second modified time to collision thresholds, sending a signal to a driver interface to provide an initial warning to the driver of the vehicle when the actual time to collision is less than the first modified time to collision threshold, and sending a signal to the driver interface to provide an imminent collision warning to the driver of the vehicle when the actual time to collision is less than the second modified time to collision threshold.

According to another aspect of the present disclosure, identifying when a driver of the vehicle is distracted and measuring the amount of time that the driver of the vehicle has been distracted with a driver monitoring system further includes recognizing and determining the position of the face of a driver of the vehicle with a camera mounted within the vehicle.

According to another aspect of the present disclosure, detecting an object in front of the vehicle and determining the distance between the object and the vehicle with a detection system further includes using an external object computation module, a plurality of detection devices, and a sensor-object fusion algorithm to detect and determine the distance between the object and the vehicle.

According to another aspect of the present disclosure, modifying a first pre-determined time to collision threshold based on information from the driver monitoring system and creating a first modified time to collision threshold and modifying a second pre-determined time to collision threshold based on information from the driver monitoring system and creating a second modified time to collision threshold further includes, modifying the first and second pre-determined time to collision thresholds equally such that the first modified time to collision threshold is greater than the first pre-determined time to collision threshold and the second modified time to collision threshold is greater than the second pre-determined time to collision threshold when the driver monitoring system indicates the driver of the vehicle is distracted, and modifying the first and second pre-determined time to collision thresholds such that the first and second modified time to collision thresholds are directly related to the length of time the driver has been distracted and the first and second modified time to collision thresholds increases as the length of time the driver has been distracted increases.

According to another aspect of the present disclosure, modifying a first pre-determined time to collision threshold based on information from the driver monitoring system and creating a first modified time to collision threshold and modifying a second pre-determined time to collision threshold based on information from the driver monitoring system and creating a second modified time to collision threshold further includes, modifying the first and second pre-determined time to collision thresholds such that the first modified time to collision threshold is equal to the first pre-determined time to collision threshold and the second modified time to collision threshold is equal to the second pre-determined time to collision threshold when the driver monitoring system indicates the driver of the vehicle is not distracted.

According to another aspect of the present disclosure, modifying a first pre-determined time to collision threshold based on information from the driver monitoring system and creating a first modified time to collision threshold and modifying a second pre-determined time to collision threshold based on information from the driver monitoring system and creating a second modified time to collision threshold further includes, identifying the first and second pre-determined time to collision thresholds from a look-up table stored within a controller based on the speed of the vehicle and the actual time to collision.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
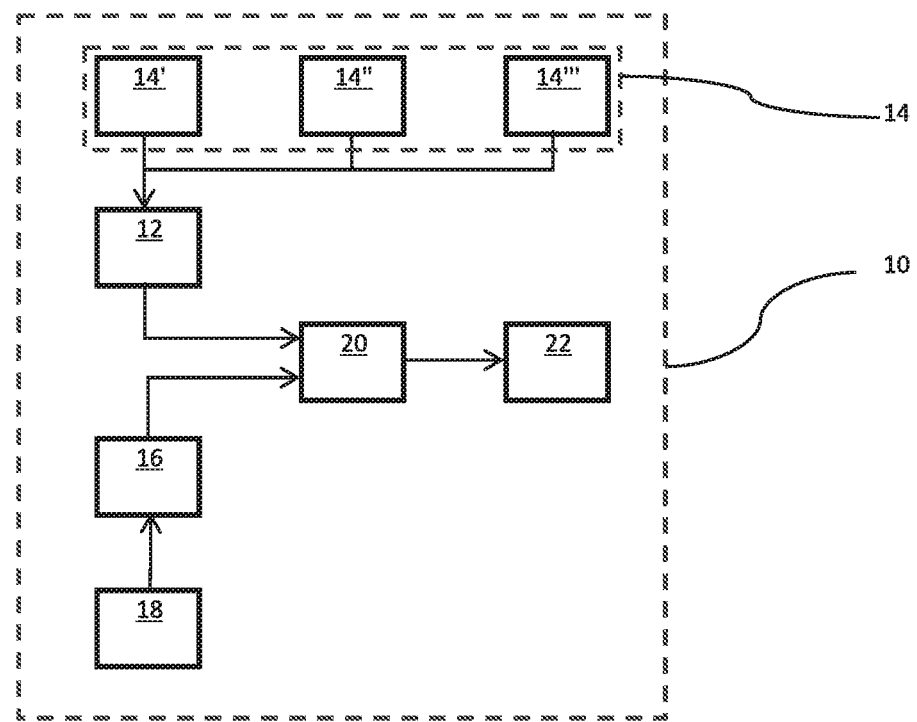
FIG. 1 is a schematic view of the system of the present disclosure according to an exemplary embodiment.

Referring to FIG. 1, a system 10 for providing warning of an impending collision to a driver of an automotive vehicle according to the present disclosure comprises a detection system 12 adapted to detect an object in front of the vehicle and to determine the distance between the object and the vehicle. The detection system 12 of an exemplary embodiment is an external object computation module (EOCM). The EOCM 12 communicates with a plurality of sensors 14 in the vehicle that are adapted to detect the presence of an object, such as another vehicle, in front of the vehicle. The plurality of sensors 14 includes different types of sensors 14 that use different methods to detect an object and measure the distance between the vehicle and the object. The types of sensors 14 that may be used by the detection system 12 includes, but is not limited to, a radar sensor 14', a lidar sensor 14", and a camera 14'".

The EOCM 12 uses a sensor-object fusion algorithm along with input from the plurality of sensors 14 to detect and determine the distance between the object and the vehicle. Signals from several sensors 14, including camera, radar and lidar sensors 14 are combined to estimate the distance between the vehicle and an object detected in front of the vehicle. Each sensor 14 provides different types of information about the tracked object position with differing accuracies, especially in different weather conditions. For example, a lidar based sensor 14" can provide good resolution about the position but can suffer for accuracy in poor weather. On the other hand, the spatial resolution of a radar sensor 14' is relatively poor compared to laser but provides better accuracy in poor weather. Also, unlike a lidar sensor 14", a radar sensor 14' can provide information about the velocity and bearing of an object. Laser data is also more computationally intensive because a laser sends lots of data about each individual laser point of range data. The sensor-object fusion algorithm merges information from the different sensors 14 to provide a more accurate determination of the distance between the object and the vehicle.

A driver monitoring system 16 is adapted to identify when a driver of the vehicle is distracted and to measure the amount of time that the driver of the vehicle has been distracted. A driver monitoring system 16 of an exemplary embodiment includes a camera 18 mounted within the vehicle. The camera 18 is adapted to recognize and determine the position of the face of a driver of the vehicle. The driver monitoring system 16 uses an infrared LED along with the camera 18, and monitors the driver for signs of inattention or sleepiness by identifying the drivers face, detecting the position of the face and what direction the face is directed to determine if the driver of the vehicle is paying attention to the road. If the driver monitoring system 16 determines that the driver is not looking forward at the road, the driver monitoring system 16 will determine that the driver is distracted, and immediately begin keeping track of how long this condition continues.

Advanced driver monitoring systems 16 use the camera 18 to monitor the eyes of the driver of the vehicle specifically. These systems 16 will watch eye movement and changes in the eyes (more open/more closed) to determine if a driver is tired or fatigued. If the driver monitoring system 16 determines that the driver is tired or fatigued, the driver monitoring system 16 will determine that the driver is distracted, and immediately begin keeping track of how long this condition continues.

A controller 20 is adapted to receive information from the detection system 12 and the driver monitoring system 16. The controller 20 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The controller 20 calculates an actual time to collision based on the distance between the object and the vehicle and the speed of the vehicle. The controller 20 holds a look-up table of pre-determined time to collision threshold data therein. The controller 20 identifies a pre-determined time to collision threshold from the look-up table stored therein based on the speed of the vehicle and the actual time to collision. The pre-determined time to collision threshold data is accumulated through extensive testing and calibration to determine safe stopping distance for a vehicle at a given speed as it approaches an object located in front of the vehicle. When the actual time to collision is less than the pre-determined time to collision threshold, the controller will send a signal to a driver interface 22 within the vehicle to warn the driver of the impending collision.

The controller 20 is further adapted to modify a pre-determined time to collision threshold based on information from the driver monitoring system 16. If the driver monitoring system 16 determines that the driver is distracted, the driver monitoring system 16 sends a signal to the controller 20 indicating that the driver is distracted and how long the driver has been distracted. The signal from the driver monitoring system 16 is continuously updated so the controller 20 gets continuous updates on the length of time the driver has been distracted.

When the driver monitoring system 16 indicates the driver of the vehicle is distracted the controller 20 modifies the pre-determined time to collision threshold by adding time. The modified time to collision threshold is greater than the pre-determined time to collision threshold pulled from the look-up table. If the driver of the vehicle is distracted, it will take the driver longer to realize that he is being warned of an impending collision, and it will take longer for the driver to react to the warning. Therefore, when the driver monitoring system 16 indicates the driver of the vehicle is distracted the controller 20 modifies the pre-determined time to collision threshold to provide a warning signal to the driver interface 22 sooner. When the actual time to collision is less than the modified pre-determined time to collision threshold, the controller will send a signal to a driver interface 22 within the vehicle to warn the driver of the impending collision.

The time necessary for a distracted driver to react to a warning of impending collision also increases as the time the drive has been distracted increases. A driver can quickly recover and regain his concentration if he or she was only briefly distracted by quickly looking away from the road. However, if a driver is continuously distracted for an extended period of time, it takes more time for the driver to regain his concentration and re-focus his attention to the road. Likewise, the driver's reaction time will suffer if the driver has been continuously distracted for any length of time.

In an exemplary embodiment of the system of the present disclosure, when the driver monitoring system 16 indicates the driver of the vehicle is distracted the controller 20 is adapted to modify the pre-determined time to collision threshold such that the modified time to collision threshold is directly related to the length of time the driver has been distracted. The modified time to collision threshold increases as the length of time the driver has been distracted increases. Therefore, when the driver monitoring system 16 indicates the driver of the vehicle is distracted the controller 20 modifies the pre-determined time to collision threshold to provide a warning signal to the driver interface 22 sooner, and continues to increase the warning time as the length of time the driver has been distracted increases. When the actual time to collision is less than the modified pre-determined time to collision threshold, the controller will send a signal to a driver interface 22 within the vehicle to warn the driver of the impending collision.

When the driver monitoring system 16 indicates the driver of the vehicle is not distracted the controller 20 is adapted to modify the pre-determined time to collision threshold such that the modified time to collision threshold is equal to the pre-determined time to collision threshold. If the driver is not distracted, then no additional time is added to the pre-determined time to collision threshold.

In an exemplary embodiment the controller 20 modifies a first pre-determined time to collision threshold based on information from the driver monitoring system to create a first modified time to collision threshold, and modifies a second pre-determined time to collision threshold based on information from the driver monitoring system to create a second modified time to collision threshold. If the driver monitoring system 16 determines that the driver is distracted, the driver monitoring system 16 sends a signal to the controller 20 indicating that the driver is distracted and how long the driver has been distracted. The signal from the driver monitoring system 16 is continuously updated so the controller 20 gets continuous updates on the length of time the driver has been distracted.

When the driver monitoring system 16 indicates the driver of the vehicle is distracted the controller 20 modifies the first and second pre-determined time to collision thresholds by adding time. The first modified time to collision threshold is greater than the first pre-determined time to collision threshold pulled from the look-up table, and the second modified time to collision threshold is greater than the second pre-determined time to collision threshold pulled from the look-up table.

If the driver of the vehicle is distracted, it will take the driver longer to realize that he is being warned of an impending collision, and it will take longer for the driver to react to the warning. Therefore, when the driver monitoring system 16 indicates the driver of the vehicle is distracted the controller 20 modifies both the first and second pre-determined time to collision thresholds to provide a warning signal to the driver interface 22 sooner. When the actual time to collision is less than the first modified pre-determined time to collision threshold, the controller 20 will send a signal to a driver interface 22 within the vehicle to provide an initial warning to the driver of an impending collision. When the actual time to collision is less than the second modified pre-determined time to collision threshold, the controller 20 will send a signal to a driver interface 22 within the vehicle to provide an imminent collision warning to the driver of an impending collision.

The time necessary for a distracted driver to react to a warning of impending collision also increases as the time the drive has been distracted increases. A driver can quickly recover and regain his concentration if he or she was only briefly distracted by quickly looking away from the road. However, if a driver is continuously distracted for an extended period of time, it takes more time for the driver to regain his concentration and re-focus his attention to the road. Likewise, the driver's reaction time will suffer if the driver has been continuously distracted for any length of time.

In an exemplary embodiment of the system of the present disclosure, when the driver monitoring system 16 indicates the driver of the vehicle is distracted the controller 20 is adapted to modify the first and second pre-determined time to collision thresholds such that the first and second modified time to collision thresholds are directly related to the length of time the driver has been distracted. The first and second modified time to collision thresholds increase as the length of time the driver has been distracted increases. Therefore, when the driver monitoring system 16 indicates the driver of the vehicle is distracted the controller 20 modifies the first and second pre-determined time to collision thresholds to provide warning signals to the driver interface 22 sooner, and continues to increase the warning times as the length of time the driver has been distracted increases. When the actual time to collision is less than the first modified pre-determined time to collision threshold, the controller 20 will send a signal to a driver interface 22 within the vehicle to provide an initial warning to the driver of an impending collision. When the actual time to collision is less than the second modified pre-determined time to collision threshold, the controller 20 will send a signal to a driver interface 22 within the vehicle to provide an imminent collision warning to the driver of an impending collision.

When the driver monitoring system 16 indicates the driver of the vehicle is not distracted the controller 20 is adapted to modify the first and second pre-determined time to collision thresholds such that the first modified time to collision threshold is equal to the first pre-determined time to collision threshold and the second modified time to collision threshold is equal to the second pre-determined time to collision threshold. If the driver is not distracted, then no additional time is added to the first and second pre-determined time to collision thresholds.

The driver interface 22 within the vehicle provides visual and audible signals to the driver of the vehicle. When the actual time to collision is less than the first modified pre-determined time to collision threshold, the controller 20 will send a signal to a driver interface 22 within the vehicle to provide an initial warning to the driver of an impending collision. The initial warning is an indication to the driver of the vehicle that the driver should be aware of the object in front of the vehicle and that the vehicle is approaching the object. The driver interface 22 likely will provide a yellow light, and possibly a simple audible chime to get the driver's attention.

When the actual time to collision is less than the second modified pre-determined time to collision threshold, the controller 20 will send a signal to a driver interface 22 within the vehicle to provide an imminent collision warning to the driver of an impending collision. The imminent collision warning is an indication to the driver of the vehicle that an object in front of the vehicle is too close. The distance between the object and the vehicle may not allow the driver to safely stop within that distance at the current speed. This warning is meant to alert the driver that immediate action is necessary to avoid a collision. The driver interface 22 likely will provide a red light, a continuous audible alarm, and physical notification, such as vibrating the seat or steering wheel, to get the driver's attention.

It should be understood, the system 10 may have the capability to be manually tuned by the driver of the vehicle. In other words, the driver can select between pre-determined time to collision thresholds that are highly conservative, or time to collision thresholds that are less conservative. The system and exemplary embodiments described herein provide modification 42, 46 of the pre-determined time to crash thresholds base solely on the driver being distracted. The pre-determined time to crash thresholds are modified 42, 46, using the values currently employed by the controller 20, whether those values are the original default values for the first and second pre-determined time to collision thresholds based on the current conditions, or the values have been manually tuned by the operator of the vehicle. Whatever the current time to crash thresholds are set to, detection of a distracted driver results in modification 42, 46 to increase the time to crash thresholds.

Figure 2:
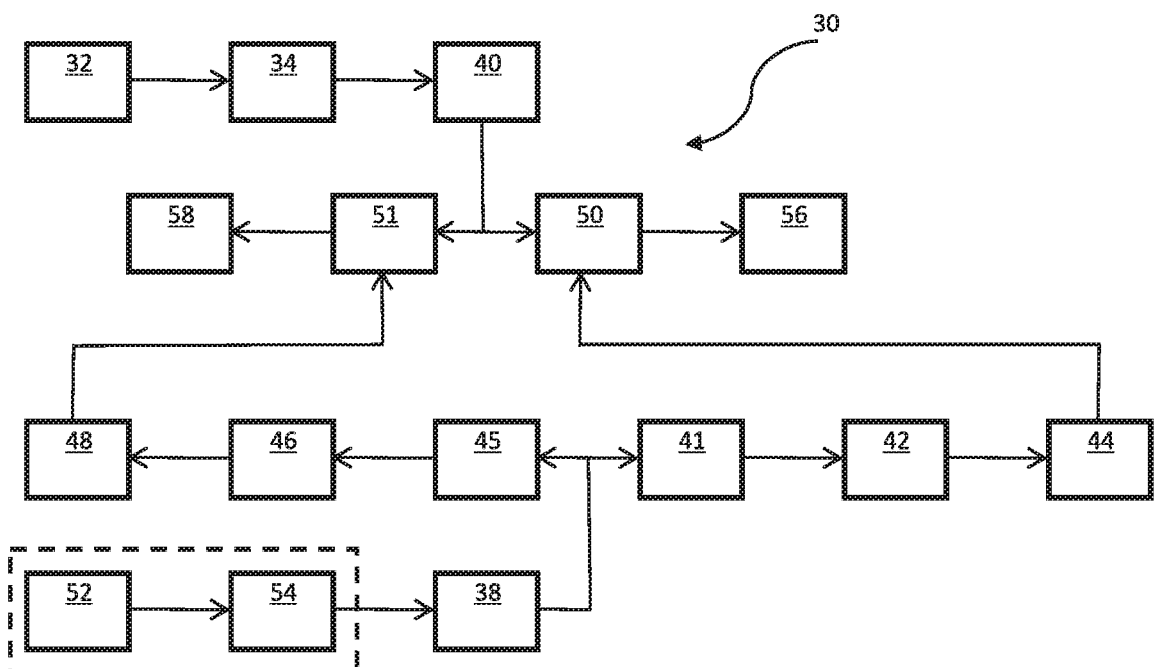
FIG. 2 is a schematic view of a method of the present disclosure according to an exemplary embodiment.

Referring to FIG. 2, a method 30 of providing warning of an impending collision to a driver of an automotive vehicle comprises detecting 32 an object in front of the vehicle and determining 34 the distance between the object and the vehicle with a detection system 12. In an exemplary embodiment, the detection system 12 is an external object computation module which uses information from a plurality of sensors 14, and a sensor-object fusion algorithm to determine 34 the distance between the vehicle and the detected object.

A driver monitoring system 16 identifies 36 when a driver of the vehicle is distracted and measures 38 the amount of time that the driver of the vehicle has been distracted. In an exemplary embodiment, identifying 36 when the driver of the vehicle is distracted includes recognizing 52 and determining 54 the position of the face of a driver of the vehicle with a camera 18 mounted within the vehicle.

The method further includes calculating 40 an actual time to collision based on the distance between the object and the vehicle and the speed of the vehicle, identifying 41 a first pre-determined time to collision threshold from a look-up table, and modifying 42 a first pre-determined time to collision threshold based on information from the driver monitoring system 16 and creating 44 a first modified time to collision threshold, identifying 45 a second pre-determined time to collision threshold from a look-up table, and modifying 46 a second pre-determined time to collision threshold based on information from the driver monitoring system 16 and creating 48 a second modified time to collision threshold.

If the driver monitoring system 16 indicates the driver of the vehicle is distracted, the first and second pre-determined time to collision thresholds are modified 42, 46 equally such that the first modified time to collision threshold is greater than the first pre-determined time to collision threshold and the second modified time to collision threshold is greater than the second pre-determined time to collision threshold. Further, the first and second pre-determined time to collision thresholds are modified 42, 46 such that the first and second modified time to collision thresholds are directly related to the length of time the driver has been distracted, and the first and second modified time to collision thresholds increase as the length of time the driver has been distracted increases.

Alternatively, if the driver monitoring system 16 indicates the driver of the vehicle is not distracted, the first and second pre-determined time to collision thresholds are modified 42, 46 such that the first modified time to collision threshold is equal to the first pre-determined time to collision threshold and the second modified time to collision threshold is equal to the second pre-determined time to collision threshold.

After creating 44, 48 the first and second modified time to collision thresholds, the actual time to collision is compared 50 to the first modified time to collision threshold and compared 51 to the second modified time to collision thresholds. The method further includes sending 56 a signal to a driver interface 22 to provide an initial warning to the driver of the vehicle when the actual time to collision is less than the first modified time to collision threshold, and sending 58 a signal to the driver interface to provide an imminent collision warning to the driver of the vehicle when the actual time to collision is less than the second modified time to collision threshold.

A system 10 and method 30 of the present disclosure offers several advantages. Most notably, the system 10 and method 30 of the present disclosure detects when the driver of a vehicle is distracted and increases the pre-determined warning times of a forward collision alert system to give a distracted driver more time to recognize the warning and to react to the warning.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for providing warning of an impending collision to a driver of an automotive vehicle, comprising:
   a detection system adapted to detect an object in front of the vehicle and to determine a distance between the object and the vehicle, wherein the detection system is an external object computation module that uses a plurality of detection devices and a sensor-object fusion algorithm to detect and determine the distance between the object and the vehicle;
   a driver monitoring system adapted to identify when a driver of the vehicle is distracted and to measure an amount of time that the driver of the vehicle has been distracted;
   a driver interface within the vehicle; and
   a controller adapted to receive information from the detection system and the driver monitoring system, calculate an actual time to collision based on the distance between the object and the vehicle and a speed of the vehicle, modify a first pre-determined time to collision threshold based on information from the driver monitoring system to create a first modified time to collision threshold, modify a second pre-determined time to collision threshold based on information from the driver monitoring system to create a second modified time to collision threshold, compare the actual time to collision to the first and second modified time to collision thresholds, send a signal to the driver interface to provide an initial warning to the driver of the vehicle when the actual time to collision is less than the first modified time to collision threshold, and send a signal to the driver interface to provide an imminent collision warning to the driver of the vehicle when the actual time to collision is less than the second modified time to collision threshold;

wherein the controller identifies the first and second pre-determined time to collision thresholds from a look-up table stored within the controller based on the speed of the vehicle and the actual time to collision.

2. The system of claim 1, wherein the driver monitoring system includes a camera mounted within the vehicle and adapted to recognize and determine a position of a face of a driver of the vehicle.

3. The system of claim 1, wherein when the driver monitoring system indicates the driver of the vehicle is distracted the controller is adapted to modify the first and second pre-determined time to collision thresholds equally such that the first modified time to collision threshold is greater than the first pre-determined time to collision threshold and the second modified time to collision threshold is greaterthan the second pre-determined time to collision threshold.

4. The system of claim 3, wherein when the driver monitoring system indicates the driver of the vehicle is distracted the controller is adapted to modify the first and second pre-determined time to collision thresholds such that the first and second modified time to collision thresholds are directly related to a length of time the driver has been distracted and the first and second modified time to collision thresholds increases as the length of time the driver has been distracted increases.

5. The system of claim 1, wherein when the driver monitoring system indicates the driver of the vehicle is not distracted the controller is adapted to modify the first and second pre-determined time to collision thresholds such that the first modified time to collision threshold is equal to the first pre-determined time to collision threshold and the second modified time to collision threshold is equal to the second pre-determined time to collision threshold.

6. A method of providing warning of an impending collision to a driver of an automotive vehicle, comprising:
using an external object computation module, a plurality of detection devices, and a sensor-object fusion algorithm to detect an object in front of the vehicle and determine a distance between the object and the vehicle with a detection system;
identifying when a driver of the vehicle is distracted and measuring an amount of time that the driver of the vehicle has been distracted with a driver monitoring system;
calculating an actual time to collision based on the distance between the object and the vehicle and a speed of the vehicle;
identifying a first pre-determined time to collision threshold and a second pre-determined time to collision threshold from a look-up table stored within a controller based on the speed of the vehicle and the actual time to collision;
modifying the first pre-determined time to collision threshold based on information from the driver monitoring system and creating a first modified time to collision threshold;
modifying the second pre-determined time to collision threshold based on information from the driver monitoring system and creating a second modified time to collision threshold;
comparing the actual time to collision to the first and second modified time to collision thresholds;
sending a signal to a driver interface to provide an initial warning to the driver of the vehicle when the actual time to collision is less than the first modified time to collision threshold; and
sending a signal to the driver interface to provide an imminent collision warning to the driver of the vehicle when the actual time to collision is less than the second modified time to collision threshold.

7. The method of claim 6, wherein identifying when a driver of the vehicle is distracted and measuring the amount of time that the driver of the vehicle has been distracted with a driver monitoring system further includes recognizing and determining a position of a face of a driver of the vehicle with a camera mounted within the vehicle.

8. The method of claim 6, wherein modifying a first pre-determined time to collision threshold based on information from the driver monitoring system and creating a first modified time to collision threshold and modifying a second pre-determined time to collision threshold based on information from the driver monitoring system and creating a second modified time to collision threshold further includes:
modifying the first and second pre-determined time to collision thresholds equally such that the first modified time to collision threshold is greater than the first pre-determined time to collision threshold and the second modified time to collision threshold is greater than the second pre-determined time to collision threshold when the driver monitoring system indicates the driver of the vehicle is distracted; and
modifying the first and second pre-determined time to collision thresholds such that the first and second modified time to collision thresholds are directly related to a length of time the driver has been distracted and the first and second modified time to collision thresholds increases as the length of time the driver has been distracted increases.

9. The method of claim 6, wherein modifying a first pre-determined time to collision threshold based on information from the driver monitoring system and creating a first modified time to collision threshold and modifying a second pre-determined time to collision threshold based on information from the driver monitoring system and creating a second modified time to collision threshold further includes:
modifying the first and second pre-determined time to collision thresholds such that the first modified time to collision threshold is equal to the first pre-determined time to collision threshold and the second modified time to collision threshold is equal to the second pre-determined time to collision threshold when the driver monitoring system indicates the driver of the vehicle is not distracted.

10. The method of claim 6, wherein modifying a first pre-determined time to collision threshold based on information from the driver monitoring system and creating a first modified time to collision threshold and modifying a second pre-determined time to collision threshold based on information from the driver monitoring system and creating a second modified time to collision threshold further includes:
identifying the first and second pre-determined time to collision thresholds from a look-up table stored within a controller based on the speed of the vehicle and the actual time to collision.

* * * * *